April 16, 1940. D. A. BELDEN 2,197,141
POURING VESSEL
Filed May 3, 1938 2 Sheets-Sheet 1
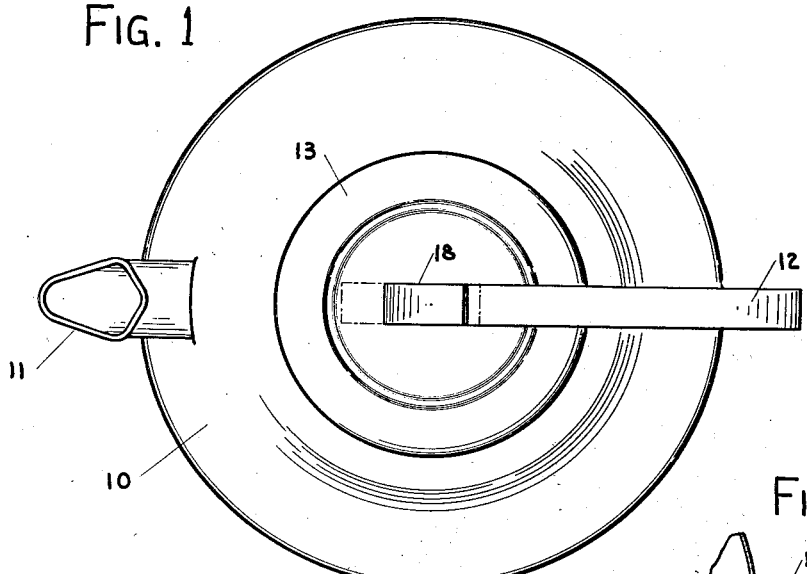
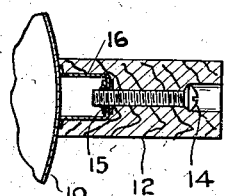
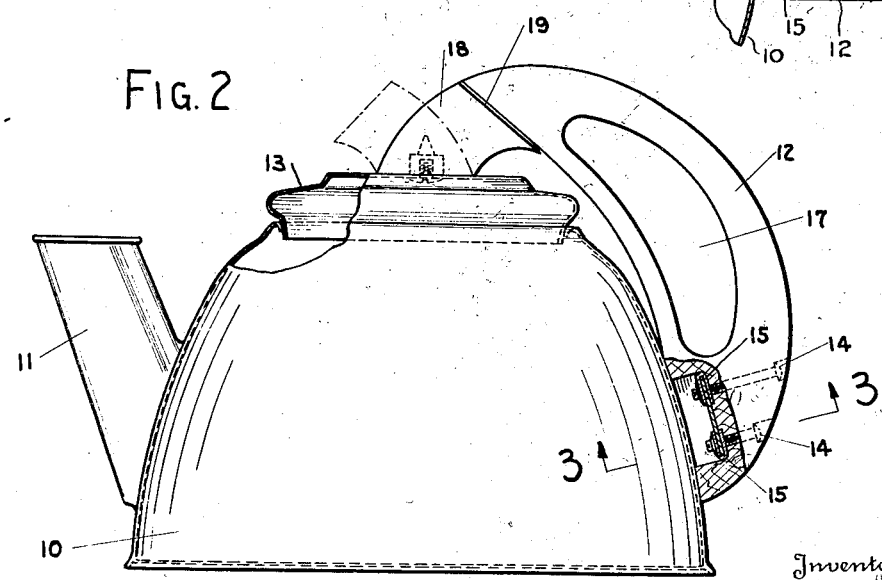
Inventor
DON A. BELDEN
By J Ralph Barrow,
Attorney April 16, 1940.  D. A. BELDEN  2,197,141
POURING VESSEL
Filed May 3, 1938  2 Sheets-Sheet 2

Inventor
DON A. BELDEN
By J. Ralph Barrow,
Attorney

Patented Apr. 16, 1940

2,197,141

UNITED STATES PATENT OFFICE 2,197,141

POURING VESSEL

Don A. Belden, Akron, Ohio

Application May 3, 1938, Serial No. 205,777

3 Claims. (Cl. 53—9)

This invention relates to pouring vessels of a type provided with open tops and lids or closures therefor with which are associated means for the prevention of dislodgment of the lid or closure when the vessel is tilted for pouring.

The general purpose of the invention is to provide such a vessel with a handle and a lid or closure so associated that the lid in at least one position on the vessel cannot be dislodged off the vessel when the same is tilted.

The foregoing and other purposes of the invention are attained in the tea kettles illustrated in the accompanying drawings and described below. It is to be understood that the invention is not limited to the specific form thereof shown and described.

Of the accompanying drawings,

Figure 1 is a plan view of a tea kettle embodying the invention.

Figure 2 is an elevation thereof.

Figure 3 is a section on line 3—3 of Figure 2.

Figure 4:
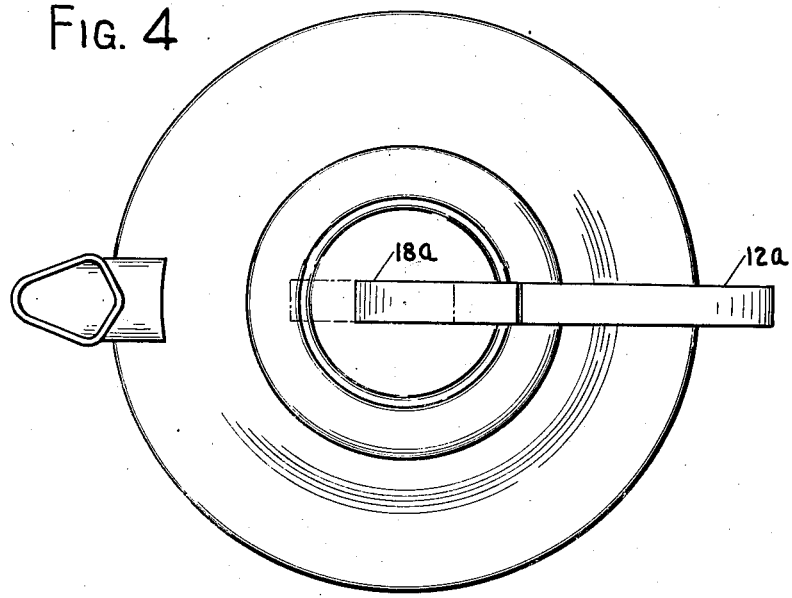
Figure 4 is a plan of a modified form of the invention.

Referring to Figures 1 to 3 of the accompanying drawings, the numeral 10 designates a vessel such as a tea kettle which may have a pouring spout 11, a handle 12 and a closure, lid or cover 13 fitting into the usual top opening of the vessel.

Handle 12 may be secured on the vessel 10 in any suitable way as by screws 14 extending through the handle and threaded into nuts 15, 15 arranged in any suitable way in a channel piece 16 secured onto vessel 10, said channel piece preferably fitting in a slot formed in handle 12 (see Figure 3).

Handle 12 may be formed with an opening as at 17 to provide a suitable hand grip portion and is extended upwardly to the top of the vessel adjacent the top or lid 13. The lid 13 is provided with a knob 18 which may be shaped and suitably secured to the lid, as shown, so that in one position of lid 13 the knob 18 has the appearance of a continuation of the handle, the two merging and preferably being separated by a gap at 19, although in certain types of construction knob 18 may contact the handle.

In placing the lid on the pot it may be placed with knob 18 in the dotted-line position and the lid rotated on the top of the vessel until the knob 18 assumes the full-line position thereof in cooperation with the handle. In this position it is impossible for the lid to become cocked sufficiently in the top opening so as to loosen and fall off the vessel when the vessel is tilted for pouring.

Figure 5:
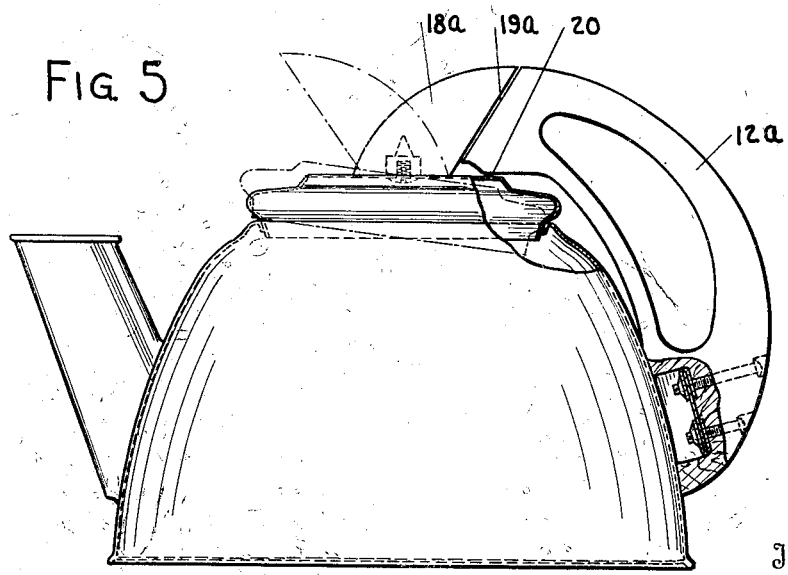
Figure 5 is an elevation thereof.

The position or direction of the gap or adjoining ends between the handle and the lid knob is not controlling in this type of construction. For instance, in the modified form of the invention shown in Figures 4 and 5, the handle 12a may be shaped so as closely to embrace the lid as at 20 and the gap 19a may be at an opposite angle, the clearance between handle 12a and knob 18a being such that the lid cannot be cocked or tilted to disengage it from the vessel excepting when knob 18a is turned to the dotted-line position shown.

It will be apparent from the foregoing that within the spirit and scope of the invention there are various ways a pouring vessel may be provided with a lid, knob and handle, so formed that by rotation to one position the knob will merge with the handle with or without a gap or clearance between them, the knob and handle being so formed that the lid is embraced and held against dropping or sliding out of the top of the pouring vessel when the knob is in that position and the lid being removable by rotation of the knob out of merging relation with the handle. Hence, numerous modifications of the invention, other than those disclosed, may be resorted to without departing from the spirit thereof or the scope of the appended claims.

What is claimed is:

1. The combination in a pouring vessel having an open top and a lid, of a handle secured onto the pot at the rear thereof and extending upwardly above the lid, said lid having a radially extending knob centrally of the top thereof adapted to be rotated to or from a position in which it extends toward the rear of the pot and merges with the handle to lock the lid on the vessel against displacement when pouring, there being clearance between the knob and the handle, whereby the knob can be turned freely away from the handle and from its locked position to release the lid, the knob and handle being so formed when merged as to embrace the lid and prevent its sliding or dropping off the vessel when the vessel is tilted for pouring.

2. The combination in a pouring vessel having an open top and a lid, of a handle secured onto the rear of the pot and extending upwardly above the lid, said lid having a radially extending knob centrally of the top thereof adapted to be rotated to or from a position in which it extends toward the rear of the pot and merges with the handle with clearance between the knob and the handle, the knob and handle being so formed when merged as to embrace the lid and prevent its sliding or dropping off the vessel when the vessel is tilted for pouring, said knob being attached to the lid, whereby the lid rotates with the knob and said clearance permitting free turning of the knob away from the handle to release the lid for removal.

3. The combination in a pouring vessel having an open top and a lid, of a handle secured onto the rear of the pot and extending upwardly above the lid, said lid having a radially extending knob centrally of the top thereof adapted to be rotated to or from a position in which it extends toward the rear of the pot and merges with the handle with clearance between the knob and the handle, the knob and handle being so formed when merged as to embrace the lid and prevent its sliding or dropping off the vessel when the vessel is tilted for pouring, said handle being secured onto the body of the vessel and extending upwardly and having an upper end projecting at the top of the vessel and said knob being so formed and so secured to the lid as to rotate the lid and to extend, in one position of the lid, toward the rear of the pot and said upper end of the handle, the knob having an end formed corresponding to the end of the handle whereby the end of the handle and the adjacent end of the knob, in one position of the latter, cooperate to prevent sliding or dropping of the lid from the vessel when the latter is tilted for pouring, said clearance being such that the knob may be freely turned away from the handle to release it for removal.

DON A. BELDEN.